(12) United States Patent
Stählin

(10) Patent No.: US 10,055,987 B2
(45) Date of Patent: Aug. 21, 2018

(54) METHOD AND DEVICE FOR VEHICLE COMMUNICATION

(71) Applicant: CONTINENTAL AUTOMOTIVE GMBH, Hannover (DE)

(72) Inventor: Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/430,047

(22) PCT Filed: Sep. 16, 2013

(86) PCT No.: PCT/EP2013/069139
§ 371 (c)(1),
(2) Date: Mar. 20, 2015

(87) PCT Pub. No.: WO2014/044632
PCT Pub. Date: Mar. 27, 2014

(65) Prior Publication Data
US 2015/0243167 A1    Aug. 27, 2015

(30) Foreign Application Priority Data

Sep. 21, 2012  (DE) .................. 10 2012 217 013

(51) Int. Cl.
*G08G 1/0962*      (2006.01)
*H04W 76/10*       (2018.01)
(Continued)

(52) U.S. Cl.
CPC ..... *G08G 1/0962* (2013.01); *G08G 1/096791* (2013.01); *H04L 67/12* (2013.01);
(Continued)

(58) Field of Classification Search
CPC .......... G08G 1/0965; G08G 1/096791; G08G 1/09675; B60Q 1/444; B60Q 1/503;
(Continued)

(56) References Cited

U.S. PATENT DOCUMENTS 6,289,332 B2 *  9/2001  Menig ................. B60K 35/00
                                                180/167
6,636,256 B1 *  10/2003  Passman .......... G08B 13/19647
                                                348/143
(Continued)

FOREIGN PATENT DOCUMENTS

CN      101331711      12/2008
CN      101542555       9/2009
(Continued)

OTHER PUBLICATIONS

Office Action dated Apr. 5, 2017 which issued in the corresponding Chinese Patent Application No. 201380049015.0.

*Primary Examiner* — An T Nguyen
(74) *Attorney, Agent, or Firm* — Cozen O'Connor

(57) ABSTRACT

In a method for vehicle communication between a first and a second vehicle, depending on environmental information, predetermined situation messages are optionally provided for transmission from the first vehicle to the second vehicle. Depending on whether a selection is made, the selected situation message is transmitted, for example by a wireless radio link, to the second vehicle.

13 Claims, 2 Drawing Sheets

(51) Int. Cl.
*H04W 4/04* (2009.01)
*H04L 29/08* (2006.01)
*G08G 1/0967* (2006.01)
*H04W 76/02* (2009.01)

(52) U.S. Cl.
CPC ........... *H04W 4/046* (2013.01); *H04W 76/02* (2013.01); *H04W 76/10* (2018.02)

(58) Field of Classification Search
CPC ...... B60Q 1/525; B60R 1/12; G01C 21/3697; H04W 4/14
USPC .......................................... 340/435, 901, 902
See application file for complete search history.

(56) References Cited

U.S. PATENT DOCUMENTS

| | | | | |
|---|---|---|---|---|
| 7,304,589 | B2* | 12/2007 | Kagawa | G08G 1/0965 340/995.1 |
| 7,425,903 | B2* | 9/2008 | Boss | G08G 1/162 340/435 |
| 7,659,808 | B1* | 2/2010 | Cooper | B60Q 1/503 340/425.5 |
| 8,400,507 | B2* | 3/2013 | Grigsby | G08G 1/161 348/149 |
| 8,593,519 | B2* | 11/2013 | Tauchi | G01S 13/89 348/142 |
| 8,686,844 | B1* | 4/2014 | Wine | G08G 1/20 340/438 |
| 2002/0184641 | A1* | 12/2002 | Johnson | H04N 7/17318 725/105 |
| 2003/0060232 | A1* | 3/2003 | Hashimoto | G08G 1/0965 455/556.1 |
| 2004/0215373 | A1* | 10/2004 | Won | G08G 1/161 701/1 |
| 2007/0013497 | A1* | 1/2007 | Watanabe | B60Q 9/008 340/435 |
| 2007/0111672 | A1* | 5/2007 | Saintoyant | H04W 76/023 455/73 |
| 2007/0252723 | A1* | 11/2007 | Boss | G08G 1/162 340/902 |
| 2008/0158009 | A1* | 7/2008 | Yano | G08G 1/096716 340/904 |
| 2008/0244010 | A1* | 10/2008 | Singh | G06F 15/16 709/206 |
| 2009/0138828 | A1* | 5/2009 | Schultz | G06Q 10/10 715/853 |
| 2009/0176512 | A1* | 7/2009 | Morrison | G08G 1/0141 455/456.6 |
| 2009/0231432 | A1* | 9/2009 | Grigsy | G08G 1/161 348/149 |
| 2010/0019932 | A1* | 1/2010 | Goodwin | G08G 1/162 340/902 |
| 2010/0094532 | A1* | 4/2010 | Vorona | G08G 1/0104 701/119 |
| 2010/0248618 | A1 | 9/2010 | Bai et al. | |
| 2010/0267379 | A1* | 10/2010 | Stahlin | G08G 1/096716 455/426.1 |
| 2011/0102193 | A1* | 5/2011 | Stahlin | G08G 1/096716 340/905 |
| 2011/0260885 | A1* | 10/2011 | Newman | G08G 1/0965 340/902 |
| 2012/0083995 | A1* | 4/2012 | Vorona | G08G 1/0104 701/119 |
| 2012/0146809 | A1* | 6/2012 | Oh | G08G 1/205 340/901 |
| 2012/0158910 | A1* | 6/2012 | Cooper | H04L 67/1097 709/219 |
| 2013/0141309 | A1* | 6/2013 | Yoshikawa | G06F 3/1454 345/2.2 |
| 2014/0327557 | A1* | 11/2014 | Nordbruch | G01C 21/3602 340/902 |
| 2015/0088784 | A1* | 3/2015 | Dhara | G06N 5/02 706/11 |
| 2015/0243167 | A1* | 8/2015 | Stahlin | G08G 1/096791 340/902 |

FOREIGN PATENT DOCUMENTS

| | | |
|---|---|---|
| CN | 101650873 | 2/2010 |
| DE | 197 30 792 | 1/1999 |
| DE | 10 2008 012 660 | 12/2008 |
| DE | 10 2007 030839 A1 | 1/2009 |
| DE | 10 2008 037 883 | 4/2009 |
| DE | 10 2010 007 259 A1 | 8/2011 |
| EP | 1 515 292 A1 | 3/2005 |
| WO | WO 2010/130741 A1 | 11/2010 |

* cited by examiner

METHOD AND DEVICE FOR VEHICLE COMMUNICATION

CROSS-REFERENCE TO RELATED APPLICATIONS

This is a U.S. national stage of application No. PCT/EP2013/069139, filed on 16 Sep. 2013, which claims priority to the German Application No. DE 10 2012 217 013.8 filed 19 Sep. 2012, the content of both incorporated herein by reference.

BACKGROUND OF THE INVENTION

1. Field of the Invention

The invention relates to a method and a corresponding device for vehicle communication between a first vehicle and a second vehicle.

2. Related Art

In road traffic, vehicle drivers often communicate using the vehicle horn or light signals. However, these signals are often difficult to interpret for the vehicle driver of the vehicle to whom the signal is directed.

EP 1 515 292 A1 discloses a communication system for a vehicle, in which light is emitted by a headlight or a rear light of the vehicle. A signal from a modulator is superimposed on the light. The modulated light is received by a light receiving unit of a second vehicle. The received modulated light is demodulated by a decoder for display on a display panel.

DE 10 2010 007 259 A1 discloses a method for transmitting information relating to a defect in at least one part of a motor vehicle. In the method, a defect in at least one part of a second motor vehicle is first of all determined by at least one occupant of a first motor vehicle. A first item of information, which uniquely identifies the second motor vehicle is input and a second item of information, which identifies the defect, is input. A first message is transmitted to a central distribution unit, the first message comprising the first item of information and the second item of information. The first item of information and the second item of information are also processed in the central distribution unit and a second message is transmitted from the central distribution unit to at least one contact address.

SUMMARY OF THE INVENTION

An object of the present invention is to provide a method and a corresponding device for enabling vehicle communication between a first vehicle and a second vehicle.

According to a first aspect, the invention is distinguished by a method and a corresponding device for vehicle communication between a first vehicle and a second vehicle. Predefined situation messages are provided for transmission from the first vehicle to the second vehicle. Depending on a selection of a provided situation message, the selected situation message is transmitted to a second vehicle using a wireless radio link.

By virtue of the fact that situation messages are predefined and the predefined situation messages are provided, it is possible, following a selection, to transmit the selected situation message to the second vehicle. A wireless radio link makes it possible for a first communication unit in the first vehicle, which provides the situation message, to require no direct visual contact with a second communication unit in the second vehicle, which receives the situation message. This makes it possible to enable vehicle communication in a simple and robust manner.

According to a second aspect, the invention is distinguished by a method and a corresponding device for vehicle communication between a first and a second vehicle. Environment information having traffic-related features of the environment around the first vehicle is provided. An environmental situation in which the first vehicle is situated is determined on the basis of the environment information. At least one predefined situation message is provided on the basis of the environmental situation. Depending on a selection of a provided situation message, the selected situation message is transmitted to the second vehicle. As a result of the fact that at least one situation message is provided on the basis of the environmental situation, the situation messages can be restricted such that they match the environmental situation. It is not necessary to always provide all predefined situation messages. A situation message can thus possibly be selected more easily for transmission to the second vehicle.

According to another refinement, the situation message is selected manually. As a result, only one situation message is transmitted to the second vehicle if desired by the vehicle driver.

According to another advantageous refinement, the situation message is selected automatically. As a result, important situation messages may possibly be transmitted automatically if a situation message can be reliably inferred from the environmental situation, for example.

According to another advantageous refinement, the predefined situation message is provided for display on a display apparatus of the first vehicle. As a result, it is possibly easy for the vehicle driver to understand which situation message is intended to be transmitted.

According to another advantageous refinement, the display apparatus has a touchscreen. The situation message is selected sing the touchscreen. As a result, it is possibly easy and comprehensible to select the situation message.

According to another advantageous refinement, if a plurality of predefined situation messages are provided, the situation messages are organized. The situation messages are organized on the basis of a probability of a respective use. The probability may thus be determined, for example, on the basis of a respective frequency of the use of the respective situation message. As a result, the situation message, which is intended to be transmitted to the second vehicle, can be selected quickly and in a comprehensible manner.

According to another advantageous refinement, the vehicle has an environment sensor designed to sense an area of the environment of the first vehicle. The environment sensor provides sensor data relating to an image of the environment. The environment information is determined on the basis of the sensor data. If the environment sensor has already been installed in the vehicle for other purposes, for example, the environment information can be detected easily and in a cost-effective manner with the aid of the environment sensor.

According to another advantageous refinement, the environment sensor has a camera and the sensor data have image data. If the camera has already been installed in the vehicle for other purposes, for example, it can be used to determine the environment information in a simple manner.

According to another advantageous refinement, map data are provided and the environment information is determined on the basis of the map data. This makes it possible to determine the environment information and/or the environmental situation possibly with little computing complexity.

According to another advantageous refinement, the selected situation message is transmitted using wireless radio transmission. There is possibly hereby no need for a first communication unit in the first vehicle, which provides the situation message, to have direct visual contact with a second communication unit in the second vehicle, which receives the situation message.

According to another advantageous refinement, the selected situation message is transmitted to a server which forwards it to the second vehicle. This can enable robust transmission.

BRIEF DESCRIPTION OF THE DRAWINGS

Exemplary embodiments of the invention are explained in more detail below using the schematic drawings, in which.

DETAILED DESCRIPTION OF THE PRESENTLY PREFERRED EMBODIMENTS

Elements having the same design or function are denoted using the same reference symbols throughout the figures.

Figure 1:
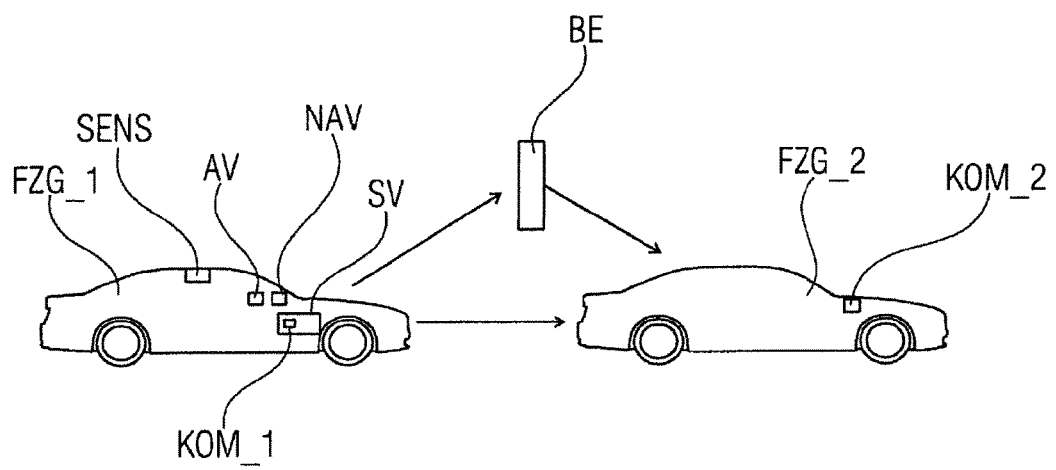
FIG. 1 shows communication between a first vehicle and a second vehicle.

In a first exemplary embodiment (FIG. 1), a first vehicle FZG_1 has a device SV. The device SV has a computing unit and a data and program memory. The device SV may be in the form of one structural unit or may be distributed to two or more structural units. The device SV has a first communication unit KOM_1. The first communication unit KOM_1 may be in the form of one structural unit or may be distributed to two or more structural units.

The first communication unit KOM_1 is configured, for example, to communicate with a second communication unit KOM_2 in a second vehicle FZG_2 and/or with a central or decentralized control computer used as a server BE. The server BE may be central or may be distributed to a plurality of server units. The server BE may be, for example, a computer in a backend.

Communication between the first vehicle FZG_1 and the second vehicle FZG_2 and/or the server BE can be implemented, for example, using a wireless radio link based on ITS-G5, RKE, WLAN, mobile radio or Bluetooth.

Alternatively or additionally, communication using a combination of light signals is possible. In this case, the second communication unit KOM_2 has a camera that detects the light signals.

Alternatively or additionally, communication using sound is possible, for example using horn signals, radar waves and/or ultrasonic waves. In this case, the second communication unit KOM_2 has a microphone configured to detect signals. In the case of radar or ultrasonic waves, it is advantageous that the latter may be transmitted in a highly directed manner, making it possible to dispense with addressing.

If communication is implemented using horn or light signals, they can be adapted to regional customs, with the result that a situation message MES intended to be transmitted may also be understood if the second vehicle FZG_2 does not have a corresponding system for communication.

The communication is addressed, for example, using an identification signal emitted by the second vehicle FZG_2. When transmitting using ITS-G5, for example, the ID of the second vehicle FZG_2 may thus be known from emitted Cooperative Awareness Messages (CAMs). Alternatively or additionally, the addressing is carried out using the vehicle license plate of the second vehicle FZG_2, which is detected using a vehicle camera, for example, and/or is input manually. Alternatively or additionally, the addressing is carried out using a position of the second vehicle FZG_2.

A predefined situation message MES can be transmitted during communication. The predefined situation messages MES are situation messages MES which are stored in the data memory of the device SV, for example. The predefined situation messages MES are, for example, messages relating to the vehicle state of the second vehicle FZG_2 and/or messages relating to the traffic situation and/or the right of way situation between the first vehicle FZG_1 and the second vehicle FZG_2. Such situation messages MES may be, for example:

A light of the second vehicle FZG_2 is not working;

The traffic light is green, and the second vehicle FZG_2 can drive away;

The second vehicle FZG_2 can go back into the lane again (following an overtaking maneuver);

The first vehicle FZG_1 would like to overtake the second vehicle FZG_2;

The first vehicle FZG_1 would like to go back into the other lane again (following an overtaking maneuver);

The first vehicle FZG_1 allows the second vehicle FZG_2 to overtake;

The first vehicle FZG_1 stops in order to allow the second vehicle FZG_2 to leave a parking space, for example, and/or in order to give it the right of way;

The first vehicle FZG_1 would like to warn the second vehicle FZG_2 of a hazardous area and/or a speed camera and/or weather, for example.

Figure 2:
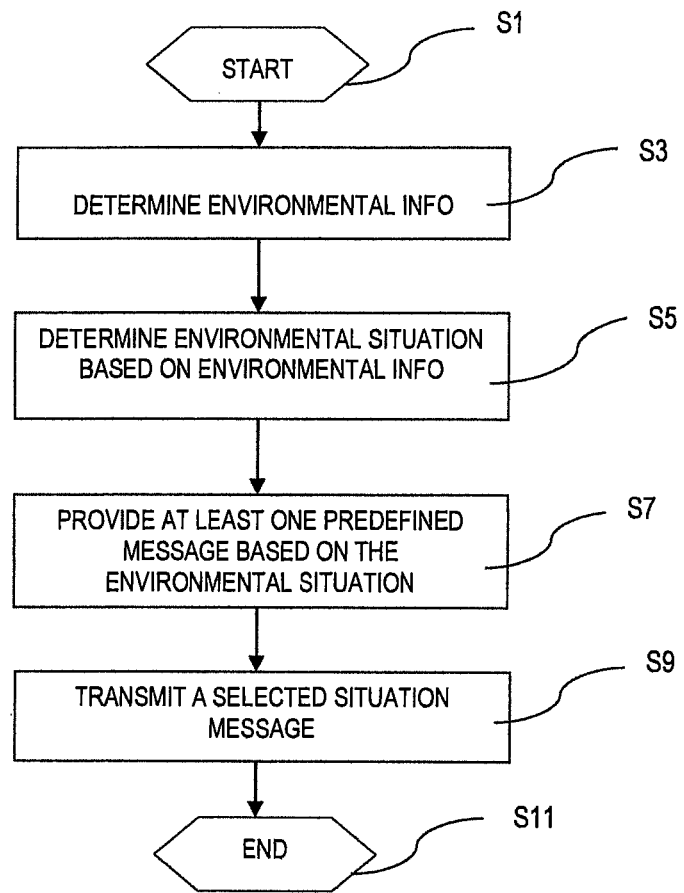
FIG. 2 shows a flowchart of a method for communication between the first and second vehicles.

FIG. 2 is a flow chart of a program executed in the device SV. The program's flow is started in a step S1 in which variables can be initialized.

In a subsequent step S3, environment information U_INFO having traffic-related features of the environment around the first vehicle FZG_1 is provided.

The environment information U_INFO contains, for example, an item of information relating to whether there are traffic signs, road signs, traffic lights, road markings, other vehicles, crash barriers and/or streets in the environment of the first vehicle FZG_1. Alternatively or additionally, the environment information U_INFO indicates, for example, whether there are obstacles and/or hazards in the environment and/or whether specific weather has been detected, for example rain.

The environment information U_INFO is determined, for example, on the basis of sensor data from an environment sensor SENS in the first vehicle FZG_1, which environment sensor is configured to sense an area of the environment of the first vehicle FZG_1. For example, the environment sensor SENS has a camera configured to record the area of the environment of the first vehicle FZG_1. The environment information U_INFO may thus be determined on the basis of image data provided by the camera.

Alternatively or additionally, the environment information U_INFO may be determined on the basis of map data. The map data are provided, for example, by the data memory of the device SV and/or by a navigation device NAV and/or by the Internet.

In a subsequent step S5, an environmental situation U_SIT is determined on the basis of the environment information U_INFO. The environmental situation U_SIT is a traffic-related situation in which the first vehicle FZG_1 is situated. Possible environmental situations U_SIT are, for example, the fact that the first vehicle FZG_1 is on a country road, on a freeway, in a city, at an intersection, in front of a traffic light and/or in a parking lot.

In a subsequent step S7, at least one predefined situation message MES is provided on the basis of the environmental situation U_SIT. For example, different situation messages MES are provided on a freeway than in the city or on a country road. For example, no situation message MES which has to do with parking maneuvers is required on a freeway.

In a subsequent step S9, after a provided situation message MES has been selected, the selected situation message MES is transmitted to the second vehicle FZG_2.

The provided situation message MES is selected automatically and/or manually, for example. An automatic selection can be carried out, for example, if the appropriate situation for a situation message MES is detected using the environment sensor. It is possible to automatically detect, for example, whether a headlight of the second vehicle FZG_2 is not functioning.

In the case of a manual selection, the predefined situation message MES is first of all displayed, for example, on a display apparatus AV of the first vehicle FZG_1. For example, if a plurality of situation messages MES are provided, the situation messages MES can be organized on the basis of a probability of the respective use. The probability of their respective use can be determined on the basis of the frequency of their use, for example.

The manual selection is made, for example, using a dedicated button and/or a voice command and/or a touchscreen of the display apparatus AV, for example.

In a subsequent step S11, the program is ended and can possibly be started again in step S1.

As an alternative to direct transmission to the second vehicle FZG_2, the situation message MES can also be transmitted to a remote computer, which may be in the form of a server BE, and may be forwarded from this server BE to the second vehicle FZG_2.

After transmission, the transmitted situation message MES can be displayed, for example, on a display unit of the second vehicle FZG_2.

In another exemplary embodiment, no environment information U_INFO is provided. Predefined situation messages MES are provided for transmission from the first vehicle FZG_1 to the second vehicle FZG_2. The predefined situation messages MES are displayed, for example, on the display apparatus AV of the first vehicle FZG_1, on which they can be organized and selected as in the first exemplary embodiment. Depending on the selection of the provided situation message MES, the selected situation message MES is transmitted to the second vehicle FZG_2 using wireless radio transmission. The wireless radio transmission can be implemented using the same radio technologies as in the first exemplary embodiment.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for vehicle communication between a first vehicle and a second vehicle, comprising:
   providing predefined situation messages for transmission from the first vehicle to the second vehicle;
   manually selecting a situation message from among manually selectable displayed ones of the predefined situation messages; and
   transmitting the selected situation message to the second vehicle,
   wherein, in the manually selecting, the manually selectable situation messages are organized for display in the first vehicle on the basis of a probability of their respective use prior to the manually selecting of the situation message for transmission to the second vehicle, such that, in particular environmental situations, only a subset that is less that all of the manually selectable situation messages is displayed, and
   wherein the probability of the respective use of the manually selectable situation messages is determined on the basis of a respective frequency of the use of the respective situation message.

2. A method for vehicle communication between a first vehicle and a second vehicle, comprising:
   providing environment information having traffic-related features of the environment around the first vehicle;
   determining an environmental situation in which the first vehicle is situated based on the provided environment information;
   providing predefined situation messages based on the determined environmental situation;
   manually selecting a situation message from among manually selectable displayed ones of the predefined situation messages; and
   transmitting the selected situation message to the second vehicle,
   wherein, in the manually selecting, the manually selectable situation messages are organized for display in the first vehicle on the basis of a probability of their respective use prior to the manually selecting of the situation message for transmission to the second vehicle, such that, in particular environmental situations, only a subset that is less that all of the manually selectable situation messages is displayed, and
   wherein the probability of the respective use of the manually selectable situation messages is determined on the basis of a respective frequency of the use of the respective situation message.

3. The method as claimed in claim 1, further comprising providing the predefined situation message for display on a display apparatus of the first vehicle.

4. The method as claimed in claim 3, wherein the display apparatus has a touchscreen, and the situation message is selected using the touchscreen.

5. The method as claimed in claim 2, wherein
   the first vehicle has an environment sensor configured to sense an area of the environment of the first vehicle, and
   the environment sensor provides sensor data relating to an image of the environment and the environment information is determined on the basis of the sensor data.

6. The method as claimed in claim 5, wherein the environment sensor has a camera and the sensor data have image data.

7. The method as claimed in claim 2, wherein map data are provided and the environment information is determined on the basis of the map data.

8. The method as claimed in claim 2, wherein the selected situation message is transmitted using wireless radio transmission.

9. The method as claimed in claim 1, wherein the selected situation message is transmitted to a server and the server forwards the selected situation message to the second vehicle.

10. A device for vehicle communication between a first vehicle and a second vehicle, the device being configured to carry out the method as claimed in claim 1.

11. The method as claimed in claim 2, further comprising providing the predefined situation message for display on a display apparatus of the first vehicle.

12. The method as claimed in claim 11, wherein the display apparatus has a touchscreen, and the situation message is selected using the touchscreen.

13. A device for vehicle communication between a first vehicle and a second vehicle, the device being configured to carry out the method as claimed in claim 2.

* * * * *